United States Patent [19]

Bauer et al.

[11] 4,007,666

[45] Feb. 15, 1977

[54] SERVOACTUATOR

[75] Inventors: Dan O. Bauer; Robert M. Salemka, both of Kalamazoo, Mich.

[73] Assignee: Pneumo Corporation, Boston, Mass.

[22] Filed: May 23, 1974

[21] Appl. No.: 472,627

[52] U.S. Cl. .................................. 91/446; 91/444; 91/461; 137/495

[51] Int. Cl.² ................ F15B 13/042; F16K 31/122

[58] Field of Search .................. 91/446, 444, 461; 137/495, DIG. 2, 624–627

[56] References Cited

UNITED STATES PATENTS

| | | | |
|---|---|---|---|
| 2,157,707 | 5/1939 | Keel | 91/446 |
| 2,731,980 | 1/1956 | Diefenderfer | 137/495 X |
| 2,822,822 | 2/1958 | Pinsenschaum | 137/624.27 |
| 3,233,623 | 2/1966 | Gray | 137/625.62 X |
| 3,511,276 | 5/1970 | Jessen et al. | 137/624.27 |
| 3,524,386 | 8/1970 | Cudnohufsky | 137/495 X |
| 3,746,401 | 7/1973 | Stearns | 137/624.27 X |
| 3,818,802 | 6/1974 | Wilson | 91/446 X |

*Primary Examiner*—Irwin C. Cohen
*Attorney, Agent, or Firm*—Donnelly, Maky, Renner & Otto

[57] ABSTRACT

A servoactuator for stopping a ram in its existing position or retracting the ram at a fixed rate to a locked position.

10 Claims, 1 Drawing Figure

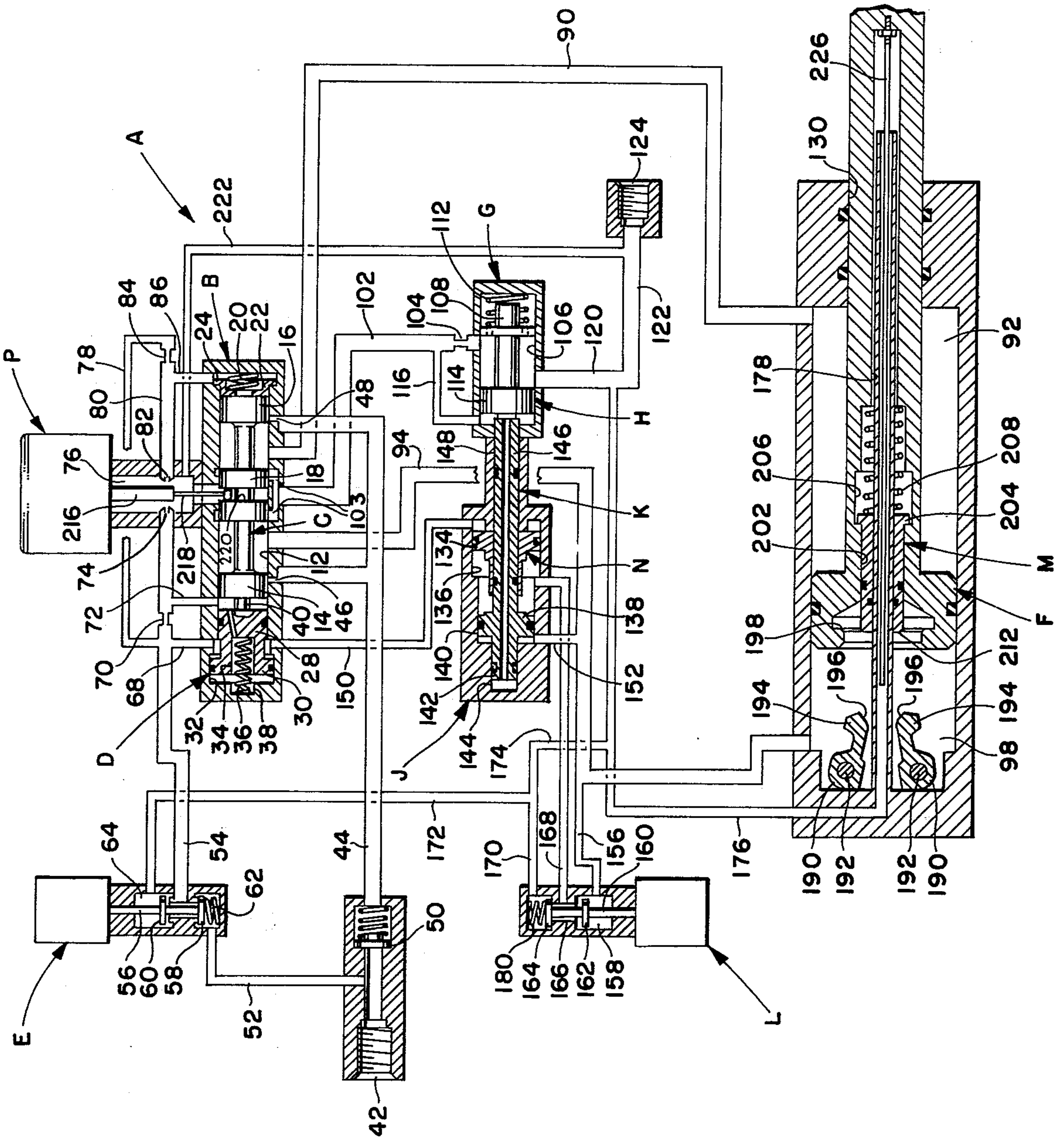
A
B
C
D
E
F
G
H
J
K
L
M
N
P
12
14
16
18
20
22
24
28
30
32
34
36
38
40
42
44
46
48
50
52
54
56
58
60
62
64
68
70
72
74
76
78
80
82
84
86
90
92
94
98
102
103
104
106
108
112
114
116
120
122
124
130
134
136
138
140
142
144
146
148
150
152
156
158
160
162
164
166
168
170
172
174
176
178
180
190
192
194
196
198
202
204
206
208
212
216
218
220
222
226

SERVOACTUATOR

BACKGROUND OF THE INVENTION

This application pertains to the art of servoactuators, and more particularly to a servoactuator for controlling the position of a ram which is connected to a controlled member. The ram may be connected to an air inlet ramp on a jet aircraft or to another controlled member.

In devices of the type described, failure of the normal controls due to battle damage or other emergency conditions makes it desirable that the controlled member have a dual mode operation; i.e. when failure occurs during mode A, the controlled member be returned at a controlled rate to a passive position; when failure occurs during mode B, the controlled members would be held in its existing position. In devices of the type described, the ram is often connected through a number of separate automatic valves which sense a failure in the control system to fix the ram in its existing position or retract it to a passive position.

Prior devices of this type include servovalves for controlling the position of the ram during normal operation, and additional servovalves and pressure operated valves for operating the ram in the event of a failure in the normal control system. The use of separate servovalves and pressure operated valves for accomplishing the dual mode functions during an emergency condition makes the servoactuator less reliable, heavier, more costly and complicated.

SUMMARY OF THE INVENTION

A servoactuator of the type described includes a servovalve for controlling the position of the ram during normal operation. A spring-loaded pressure-operated acutator cooperates with the same servovalve to retract the ram to a locked position in the event of system failure signal. This eleminates the need for additional servovalves and pressure-operated valves.

In accordance with one arrangement, the spring-loaded pressure-operated actuator is connected with a source of high pressure hydraulic fluid for shifting the pressure-operated actuator to a retracted passive position. The servovalve can then be selectively positioned during normal operation to extend or retract the ram. In the event of a system failure, loss of hydraulic pressure or a signal to deenergize the shut-off valve cuts off the source of high pressure hydraulic fluid to the actuator and vents the actuator so that it can shift to a predetermined position under spring force and move the servovalve to a discrete position for retracting the ram at a controlled rate to a locked position. The controlled member will then be held in a passive position. This operation is defined as mode A.

In accordance with another aspect of the invention, the ram has forward and rear cavities selectively connectable through the servovalve with the source of high pressure hydraulic fluid for extending or retracting the ram. One cavity is vented through the servovalve to a return port when the other cavity is connected through the servovalve to the source of high pressure hydraulic fluid. A rate limiter valve in series with the return port limits the rate at which hydraulic fluid may escape from the forward or rear cavities. A blocking valve and actuator is provided for shifting the rate limiter valve to a blocked position for preventing flow of hydraulic fluid from one cavity to the return port. A blocking valve is selectively movable in the event of a failure signal to cause hydraulic fluid to flow from the one ram cavity to the blocking acutator for extending the blocking actuator to shift the rate limiter valve to its blocked position.

In one arrangement, the blocking actuator is held in its retracted position by pressure from the source of high pressure hydraulic fluid flowing past the shut-off valve. Closing of the shut-off valve vents the blocking actuator of the high pressure hydraulic fluid. Movement of the blocking valve then enables hydraulic fluid pressure from the one cavity to extend the blocking actuator to its blocking position. The failure signal may be electrical (energize the blocking valve and deenergize the shut-off valve) or loss of hydraulic pressure and energized blocking valve; wherein an externally applied force to move the controlled member will either be blocked from extending by the inlet check valve or from retracting by the blocking actuator being shifted by the force-produced pressure to its blocked position.

This operation is defined as Mode B.

With the foregoing in mind, it is a principal object of the present invention to provide an improved servoactuator device.

A further object is to provide a compact, lightweight servoactuator which avoids the penalties of size, weight, and cost which would result from use of separate emergency mode valve and blocking valves.

Another object is to provide a servoactuator device which controls the position of a ram, and uses the same servovalve for normal operation and emergency operation.

Another object is to provide a servoactuator device which uses a normal rate limiter valve as a blocking valve under emergency conditions.

Another objective is to provide in one servoactuator, a dual emergency mode capability; A, for commanding the ram to move at a controlled rate to a passive position, and B for commanding the ram to hold its present position.

Another objective is to provide for initiation of emergency Modes A and B by electrical signal or upon loss of hydraulic pressure.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWING

The drawing shows a diagrammatic hydraulic circuit for operating the servoactuator device constructed in accordance with the present invention.

DESCRIPTION OF THE PREFERRED EMBODIMENT

Referring now to the drawing, wherein the showings are for purposes of illustrating a preferred embodiment of the invention only and not for purposes of limiting same, there is shown a servoactuator device A constructed in accordance with the present invention. Servoactuator A includes an electro-hydraulic servovalve B including a spool C longitudinally shiftable within bore 12. Spool C has opposite end lands 14 and 16, and a central land 18. A coil spring 20 bears against a plate member 22 which bears against end land 16 for aiding spool C to return to its central or null position when high pressure supply is removed. Plate 22 has an outwardly extending flange 24 which bears against the outer end surface of bore 12 to define a discrete stop for aiding in positioning spool C in its null position.

In accordance with the present invention, a spring-loaded pressure-operated actuator D has a small diameter portion 28 reciprocatingly positioned in bore 12 and an enlarged portion 30 positioned in large diameter bore 32. Actuator D has a bore 34 in the rear end thereof receiving a coil spring 36 bearing against the bottom of a small bore 38 centrally located in the bottom of bore 32. Coil spring 36 normally biases actuator D to the right in the drawing. The intersection between bore 12 and bore 32 defines a stop shoulder against which enlarged portion 30 bears for defining a predetermined position for actuator D. In this predetermined position, actuator D has a projection 40 which acts against the end of land 14 for moving spool C to a discrete position to the right of its null position.

Servoactuator A has an inlet port 42 for connection with a pump defining a source of high pressure hydraulic fluid. Conduit 44 leads from inlet port 42 to pressure ports 46 and 48 which communicate with bore 12. Conduit 44 has a check valve 50 therein for preventing reverse flow of hydraulic fluid back through inlet port 42. Conduit 52 connects conduit 42 with conduit 54 through a solenoid-operated shut-off valve E. Valve E includes a stem 56 having seats 58 and 60. Stem 56 is normally biased by spring 62 to a first position wherein seat 58 blocks communication between conduits 52 and 54. Seat 60 is then in a position establishing communication between conduit 54 and a cavity 64 within the valve E. In the energized position of shut-off valve E, seat 58 is moved to a second position establishing communication between conduits 52 and 54, while seat 60 is moved to a position blocking communication between conduit 54 and cavity 64.

Conduit 68 connects conduit 54 with enlarged bore 32 to the right of enlarged portion 30 of actuator D. A restriction 70 is formed in conduit 54 downstream of conduit 68. Conduit 72 connects conduit 54 downstream of restriction 70 with bore 12 between small diameter portion 28 of actuator D and end land 14 on spool C. Conduit 78 connects conduit 54 with conduit 80 having a restricted outlet 82 entering cavity 76 of electrohydraulic valve P, and having a restriction 84 therein. Conduit 86 downstream of restriction 84 and upstream of restricted outlet 82 connects conduit 80 with bore 12 to the right of end land 16. Conduit 54 also has a restricted outlet 74 entering cavity 76 of valve P downstream of conduit 72.

Conduit 90 communicates with bore 12 between lands 16 and 18, and with forward cavity 92 of ram F. Conduit 94 communicates with bore 12 between lands 14 and 18, and with rear cavity 98 of ram F. Return conduit 102 communicates with a return port 104 centrally of bore 12 and is normally blocked by central land 18 on spool C. Shifting movement of spool C either to the right or left will open a return fluid path through conduit 102 from between lands 14 and 18 or 16 and 18.

Conduit 102 has a restriction or orifice 104 therein, and communicates with rate limiter valve G having a bore 106 and a spool H. Spool H has a small land 108 against which a coil spring 112 bears for normally biasing spool H to the left. Spool H has another land 114. A conduit 116 connects conduit 102 with bore 106 to the left of land 114. Conduit 120 leads from bore 106 to return conduit 122 connected with return port 124 for connection with a hydraulic fluid reservoir, not shown.

Blocking actuator J includes pistons K and N. Land 134 on N is positioned in large bore 136 and a smaller land 138 on piston K is positioned in an intermediate bore 140. Small diameter rear end portion 142 of piston K is positioned in a small diameter bore 144. Piston K includes a small diameter forward portion 146 extending through bore 148 intersecting bore 106 of rate limiter valve G. Conduit 150 communicates with bore 136 to the right of land 134 and with bore 32 of actuator D.

Conduit 152 connects conduit 94 with blocking actuator bore 140 to the left of land 138. Conduit 156 connects conduit 94 with cavity 158 of solenoid-operated blocking valve L. Blocking valve L has a stem 160 including seats 162 and 164. Valve conduit portion 166 is connected with conduit 168 communicating with blocking actuator bores 136 and 140 between lands 134 and 138. Valve conduit 166 communicates with conduit 170 connected with conduit 172 leading to cavity 64 of shut-off valve E. Conduit 174 connects conduits 170 and 172 with conduit 176 communicating between conduit 120 and inner cavity 178 in ram F.

Blocking valve L includes a coil spring 180 for normally biasing stem 160 to a position wherein land 164 blocks communication between conduits 168 and 170, while seat 162 is positioned for allowing communication between conduits 156 and 168 through cavity 158. When blocking valve L is energized, seat 162 blocks communication between conduits 156 and 168 through cavity 158, while seat 164 is positioned for permitting communication between conduits 168 and 170.

Rear ram cavity 98 has locking members 190 pivoted on axes 192 for pivotal movement toward and away from one another. Locking members 190 include outer hook portions 194 and cam surfaces 196. The rear portion of ram F is recessed to provide a locking cam surface 198. A plunger M is reciprocatingly positioned in a bore 202 in ram F and includes an enlarged head 204 positioned in an enlarged bore 206. A stop shoulder for abutment by enlarged head 204 on plunger M is provided within piston F. A coil spring 208 bears against enlarged head 204 for normally holding plunger M to the left in the drawing. Plunger M includes a circumferential cam surface 212 for cooperation with cam surfaces 196 on locking members 190.

As ram F is retracted (moved toward the left in the drawing), cam surface 212 acts against cam surface 196 for pivoting locking members 190 away from one another until locking projections 194 engage behind locking cam surfaces 198. This will prevent extension of ram F from outside influences. Ram F may be unlocked by pressurizing cavity 98. The pressure will act on plunger M for shifting plunger M to the right against force of spring 208 to free locking member 190 for pivotal movement toward one another. Locking projections 194 will then be displaced from locking cam surface 198 for allowing extension of ram F.

The electro-hydraulic valve P includes a flapper 216 positioned in cavity 76 intermediate orifices 74 and 82. Flapper 216 has a mechanical connection 218 positioned in circumferential groove 220 of land 18 on spool C for providing mechanical feedback to valve P to determine the position of spool C. A conduit 222 connects cavity 76 with conduit 122 leading to return port 124.

A linear variable transformer 226 may be positioned in cavity 178 of ram F to provide electrical feedback signals proportional to the position of ram F. The signals may be fed back to an indicating device or connected (after signal conditioning) with electro-hydraulic valve P.

In operation of the servoactuator device A, high pressure hydraulic fluid is supplied to inlet port 42. Shut-off valve E is opened so that high pressure fluid flows from conduit 52 to conduits 54 and 68 for shifting actuator D to the left against the biasing force of spring 36. High pressure fluid also acts through conduits 72 and 86 against both ends of spool C for balancing the pressure acting on spool C, which will then be in its null position.

Electro-hydraulic valve P may then be energized for shifting flapper 216 toward either of the orifices 74 or 82. Shifting flapper 216 to the left will partially block orifice 74 to increase the pressure acting through conduit 72 against land 14, while the greater flow permitted through orifice 82 will reduce the pressure acting against land 16 through conduit 86. This will cause spool C to shift to the right opening pressure port 48 to communication with bore 12 between lands 16 and 18 and closing pressure port 46 against communication with bore 12 by land 14. Return port 103 will be opened to communication with bore 12 between lands 14 and 18. High pressure hydraulic fluid will then flow from pressure port 48 through bore 12 to conduit 90 and into forward ram cavity 92 for retracting ram F. Hydraulic fluid in rear ram cavity 98 is exhausted through conduit 94 to bore 12 and then through conduit 102 to rate limiter valve G. Hydraulic fluid flows through rate limiter valve G, and conduits 120 and 122, to return port 124.

If ram F is being retracted too rapidly, the flow rate through rate limiter valve G will be increased over a desirable predetermined value. At increased flow rates, restricted orifice 104 causes a greater pressure to be built up through conduit 116 acting against land 114. This greater pressure will shift spool H to the right against the force of spring 112 until land 114 partially blocks flow to conduit 120 so that ram F will not be retracted above the desirable predetermined maximum rate.

If flapper 216 is energized for movement to the right toward orifice 82, the pressure acting through conduit 86 on land 16 will increase and the pressure acting on land 14 through conduit 72 will be reduced to cause spool C to shift to the left. Pressure port 48 will then be blocked against communication with bore 12 by land 16, and conduits 90 and 102 will be opened to communication with bore 12 between lands 16 and 18. Likewise, pressure port 46 and conduit 94 will be opened to communication with bore 12 between lands 14 and 18 for supplying high pressure hydraulic fluid to rear cavity 98 to extend ram F. During this operation, high pressure fluid will be acting on land 134 of blocking actuator spool K through conduit 150. High pressure fluid will also be acting through conduit 152 on the left side of land 138, and between lands 134 and 138 through conduit 168 communicating with conduit 156 through valve cavity 158. The pressure on blocking actuator piston K is essentially balanced and is held in its retracted position to the left by piston N so that does not interfere with operation of rate limiter valve spool H.

In the event of a malfunction or emergency condition due to failure of the normal control system, shut-off valve E is de-energized. Seat 58 then closes communication between conduits 52 and 54, and conduit 54 is vented to cavity 64. The pressure acting upon spool C and actuator D through the previously described conduits is also then vented through conduit 54, valve cavity 64, and conduits 172, 174, 176 and 122 to return port 124. Actuator D then shifts to the right under the force of spring 36. Actuator projection 40 acts against land 14 for moving spool C to a discrete position to the right off of its null position. In this discrete position of spool C, pressure port 48 and conduit 90 communicate with bore 12 between lands 16 and 18, whereas pressure port 46 is blocked against communication with bore 12 by land 14. Conduits 94 and 102 also communicate with bore 12 between lands 14 and 18. High pressure hydraulic fluid will then flow from pressure port 48, at a controlled rate determined by the discrete position of spool C, through bore 12 and out conduit 90 for retracting ram F. Hydraulic fluid is exhausted from rear ram cavity 98 through conduit 94, bore 12, conduit 102, rate limiter valve G, conduit 120 and conduit 122 to return port 124. The ram locks in its retracted position by locking members 190 in the manner previously described. Ram F is then held in its retracted position so that the controlled member is in a passive position. Ram F cannot be extended by outside forces acting upon the controlled member.

With the described arrangement servovalve B serves as the normal control valve for normal retracting and extension movement of ram F, and also acts as the emergency valve under emergency conditions in cooperation with actuator D for retracting ram F at a predetermined controlled rate to a retracted and locked position. This mode A described operation is, as an example, effective for an aircraft operating at low mach ($<1.0$). Thus, with the aircraft operating at low mach, and an emergency condition results, a mode A signal will be given and will result in retraction of ram F at a predetermined rate to a retracted locked position so that the controlled member will be in a passive position.

An example of mode B effective usage would be at high mach operation of the aircraft to maintain the controlled member in its existing position at the time the failure or emergency condition occurs. In mode B, blocking solenoid valve L is energized. However, nothing occurs at this point because shut-off solenoid valve E (being energized) has override capability with respect to blocking valve L through piston N so that the system can continue under normal control through servovalve B. However, deenergization of shut-off solenoid valve E will again vent conduit 54 in the manner previously described. Actuator D again shifts to the right under the force of spring 36 and positions servovalve spool C to its discrete position to the right of null in the manner previously described. When this occurs, high pressure fluid is acting through pressure port 48 and conduit 90 to forward ram cavity 92 tending to retract ram F. Conduit 150 communicating to the right of land 134 on blocking actuator piston K is vented. Conduit 156 is blocked against communication with conduit 168 by land 162 of blocking solenoid valve L. The area between lands 138 of blocking actuator piston K and 134 of piston N is vented through conduits 168 and 170 to return port 124. Therefore, hydraulic fluid from rear ram cavity 98 through conduit 94 acts through conduit 152 to the left of land 138. The only pressure acting on blocking actuator piston K is then tending to shift blocking actuator piston K to the right until spool portion 148 acts against land 114 for shifting rate limiter valve spool H to the right so that land 114 blocks bore 106 against communication with conduit 120. Under this condition, no return fluid can flow from rear cavity 98 to return port 124, whereby ram F is held in the position it occupied at the time the failure occurred during mode B operation. Failure of system pressure will still hold ram F in this position from extending due to the existence of check valve 50 downstream of inlet pressure port 42 and from retracting by means of the externally applied force creating a reacting pressure in cavity 98 of magnitude to shift piston K into the blocked position. The controlled member operated by ram F will then be held in the position it occupied when the failure in mode B occurred. With the described operating arrangement, blocking actuator J acts against the same rate limiter valve G which is used during normal operation for providing retracting and extending movement of ram F not to exceed a predetermined rate.

This arrangement described for servoactuator A is much smaller, lighter, more reliable and very simple in operation due to use of the same servovalve and rate limiter valve for both normal operation and emergency operation.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. In a servoactuator device for controlling the position of a ram having a forward end cavity and a rear end cavity, the improvement comprising servovalve means for selectively connecting a source of high pressure hydraulic fluid to either of said cavities for selectively extending or retracting said ram, vent means for venting one of said cavities to return port means through said servovalve means when the other of said cavities is connected with said source of high pressure hydraulic fluid, ventline pressure responsive rate limiter valve means in series with said return port means for limiting the rate at which fluid is vented from said one cavity during normal operation, differential pressure responsive blocking actuator means for moving said rate limiter valve means to a blocking position for blocking flow of fluid from said one cavity to said return port means, said differential pressure responsive blocking actuator means being in operatively direct communication with said one cavity and acted upon by the pressure therein in a direction for moving said rate limiter valve means to said blocking position, and selectively operable blocking valve means for connecting said one cavity with said differential pressure responsive blocking actuator means to hold same in place and for connecting said differential pressure responsive blocking actuator means with said vent means thereby permitting said directly communicated fluid pressure from said one cavity acting on said differential pressure responsive blocking actuator means to actuate same and to move said rate limiter valve means to said blocking position.

2. In the device of claim 1, further including shut-off valve means movable between a first position connecting an override means for said blocking actuator means with said source of high pressure hydraulic fluid for holding said blocking actuator means in a retracted position and a second position for venting high pressure hydraulic fluid from said override means.

3. In the device of claim 1, wherein said one cavity comprises said rear end cavity so that retraction of said ram is prevented when said rate limiter valve means is in said blocking position.

4. In the device of claim 3, further including check valve means in the fluid flow path from said source of high pressure hydraulic fluid to said forward end cavity for preventing extension of said ram uncontrolled by said servovalve means.

5. In the device of claim 3, wherein said blocking actuator means upon being controlled by said blocking valve means to effect a blocking function is responsive during total failure of system pressure to pressure generated by any force tending to retract said ram so as to effect shifting of said blocking actuator means.

6. In a servoactuator device for controlling the position of a ram that includes a forward end cavity to which a source of high pressure hydraulic fluid may be connected for retracting said ram and a rear end cavity to which said source of high pressure hydraulic fluid may be connected for extending said ram, the improvement comprising selectively operable servovalve means for selectively supplying high pressure hydraulic fluid to said ram for extending or retracting said ram, input means to said servovalve means for normally selectively operating the same to control the position of said ram, selectively operable actuator means for moving said servovalve means to a discrete position for retracting said ram, means for selectively moving said actuator means to a first position freeing said servovalve means for selective operation by said input means and to a second position for moving said servovalve means to said discrete position for retracting said ram, said servovalve means including means for connecting said source of high pressure hydraulic fluid to said forward end and rear end cavities, respectively, to retract and to extend said ram, vent means for venting one of said cavities to return port means through said servovalve means when the other of said cavities is connected to said source of high pressure hydraulic fluid, means for controlling the rate at which fluid is vented from one of said cavities of said ram, said means for controlling the rate at which fluid is vented from said ram comprising vent line pressure responsive rate limiter valve means in fluid series connection with said return port means for controlling and limiting the rate at which fluid is vented from said one cavity during normal operation, differential pressure responsive blocking actuator means for moving said rate limiter valve means to a blocking position for blocking flow of fluid from said one cavity to said return port means, said differential pressure responsive blocking actuator means being in operatively direct communication with said one cavity and acted upon by the pressure therein in a direction for moving said rate limiter valve means to said blocking position, and selectively operable blocking valve means for connecting said one cavity with said differential pressure responsive blocking actuator means to hold same in place for connecting said differential pressure responsive blocking actuator means with said vent means, thereby permitting said directly communicated fluid pressure from said one cavity acting on said differential pressure responsive blocking actuator means to actuate same and to move said rate limiter valve means to said blocking position.

7. In the device of claim 6, wherein said one cavity comprises said rear end cavity so that retraction of said ram is prevented when said rate limiter valve means is in said blocking position.

8. In the device of claim 7, further including check valve means in the fluid flow path for said forward end cavity for preventing extension of said ram uncontrolled by said servovalve means.

9. In the device of claim 7, wherein said blocking actuator means upon being controlled by said blocking valve means to effect a blocking function is responsive during total failure of system pressure to pressure generated by any force tending to retract said ram so as to effect shifting of said blocking actuator means.

10. In the device of claim 6, wherein said means for selectively moving said servovalve actuator means comprises shut-off valve means for selectively connecting said servovalve actuator means with a high fluid pressure source to shift said servovalve actuator means to said first position and for venting pressure on said servovalve acutator means so that said servovalve actuator means moves to said second position under biasing force of a spring, said blocking actuator means including overdrive means being connected through said shut-off valve means with said high fluid pressure source for holding said blocking actuator means in a retracted position, said override means being vented when said shut-off valve means is moved to another position.

* * * * *